(12) United States Patent
Chen et al.

(10) Patent No.: US 9,681,164 B2
(45) Date of Patent: *Jun. 13, 2017

(54) SYSTEM AND METHOD FOR MANAGING PROGRAM ASSETS

(71) Applicant: Time Warner Cable Enterprises LLC, New York, NY (US)

(72) Inventors: Zhongming Chen, Erie, CO (US); Jay Thomas, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,653

(22) Filed: Oct. 19, 2015

(65) Prior Publication Data

US 2016/0044350 A1 Feb. 11, 2016

Related U.S. Application Data

(63) Continuation of application No. 12/930,023, filed on Dec. 23, 2010, now Pat. No. 9,167,210, which is a (Continued)

(51) Int. Cl.
*H04N 21/254* (2011.01)
*H04N 21/4147* (2011.01)
(Continued)

(52) U.S. Cl.
CPC ..... *H04N 21/2541* (2013.01); *H04N 7/17318* (2013.01); *H04N 21/2187* (2013.01);
(Continued)

(58) Field of Classification Search
CPC ........... H04N 21/2541; H04N 21/4147; H04N 21/2747; H04N 21/4335; H04N 21/8355;
(Continued)

(56) References Cited

U.S. PATENT DOCUMENTS 5,850,218 A 12/1998 LaJoie et al.
6,072,982 A 6/2000 Haddad
(Continued)

OTHER PUBLICATIONS

Society of Cable Telecommunication Engineers, "Digital Program Insertion Cueing Message for Cable," ANSI/SCTE 35, 2001 (Formerly DVS 253), Dec. 14, 2001.
(Continued)

*Primary Examiner* — Benjamin R Bruckart
*Assistant Examiner* — Aklil Tesfaye
(74) *Attorney, Agent, or Firm* — Cozen O'Connor; Brandon N. Sklar

(57) ABSTRACT

A method of operating a communications system storing assets for later transmission, is disclosed. The assets have respective expiration dates beyond which a right to transmit expires. The method comprises checking an expiration date of an asset and deleting the asset from storage based, at least in part, on the expiration date, a predetermined period of time added to or subtracted from the expiration date and/or whether the asset has been selected for later viewing. The predetermined period of time may provide a grace period for completing viewing of a selected asset by a user, either after or before the expiration date, depending on the rights to the asset granted by the source of the asset. The period of time may depend on a playtime of the asset and may be added to the expiration date only if the asset has been selected for viewing. Systems are also disclosed.

24 Claims, 6 Drawing Sheets

Related U.S. Application Data continuation of application No. 10/756,563, filed on Jan. 13, 2004, now Pat. No. 7,861,274.

(51) Int. Cl.

| | |
|---|---|
| *H04N 21/218* | (2011.01) |
| *H04N 21/2187* | (2011.01) |
| *H04N 21/231* | (2011.01) |
| *H04N 21/2747* | (2011.01) |
| *H04N 21/4335* | (2011.01) |
| *H04N 21/8355* | (2011.01) |
| *H04N 7/173* | (2011.01) |

(52) U.S. Cl.
CPC . *H04N 21/21815* (2013.01); *H04N 21/23109* (2013.01); *H04N 21/2747* (2013.01); *H04N 21/4147* (2013.01); *H04N 21/4335* (2013.01); *H04N 21/8355* (2013.01)

(58) Field of Classification Search
CPC ......... H04N 7/17318; H04N 21/21815; H04N 21/2187; H04N 21/23109
See application file for complete search history.

(56) References Cited

U.S. PATENT DOCUMENTS

| | | | |
|---|---|---|---|
| 6,177,931 B1 | 1/2001 | Alexander et al. | |
| 6,233,389 B1 | 5/2001 | Barton et al. | |
| 6,351,596 B1 | 2/2002 | Ostrover | |
| 6,370,319 B1 | 4/2002 | Matsumoto et al. | |
| 6,515,680 B1 | 2/2003 | Hendricks et al. | |
| 6,782,550 B1 | 8/2004 | Cao | |
| 6,789,161 B1 | 9/2004 | Blendermann et al. | |
| 7,073,189 B2 | 7/2006 | McElhatten et al. | |
| 7,369,750 B2 | 5/2008 | Cheng et al. | |
| 7,840,112 B2 | 11/2010 | Rao | |
| 7,861,274 B2 | 12/2010 | Chen et al. | |
| 7,908,626 B2 | 3/2011 | Williamson et al. | |
| 2001/0036271 A1 | 11/2001 | Javed | |
| 2002/0078176 A1 | 6/2002 | Nomura et al. | |
| 2002/0178446 A1 | 11/2002 | Sie et al. | |
| 2003/0149988 A1 | 8/2003 | Ellis et al. | |
| 2003/0154486 A1 | 8/2003 | Dunn et al. | |
| 2003/0208763 A1 | 11/2003 | McElhatten et al. | |
| 2003/0208767 A1 | 11/2003 | Williamson et al. | |
| 2004/0015999 A1 | 1/2004 | Carlucci et al. | |
| 2004/0154040 A1 | 8/2004 | Ellis | |
| 2004/0267705 A1 | 12/2004 | Lemus et al. | |
| 2009/0074380 A1 | 3/2009 | Boston et al. | |

OTHER PUBLICATIONS

Consumer Electronics Association, "CEA Standard, Line 21 Data Services," CEA-608-B, Oct. 2000.
Society of Cable Telecommunication Engineers, "Digital Program Insertion Cueing Message for Cable," SCTE/DVS 253, Sep. 27, 1999.
"Digital Audio Compression Standard (AC-3)," Dec. 20, 1995, Advanced Television Systems Committee.

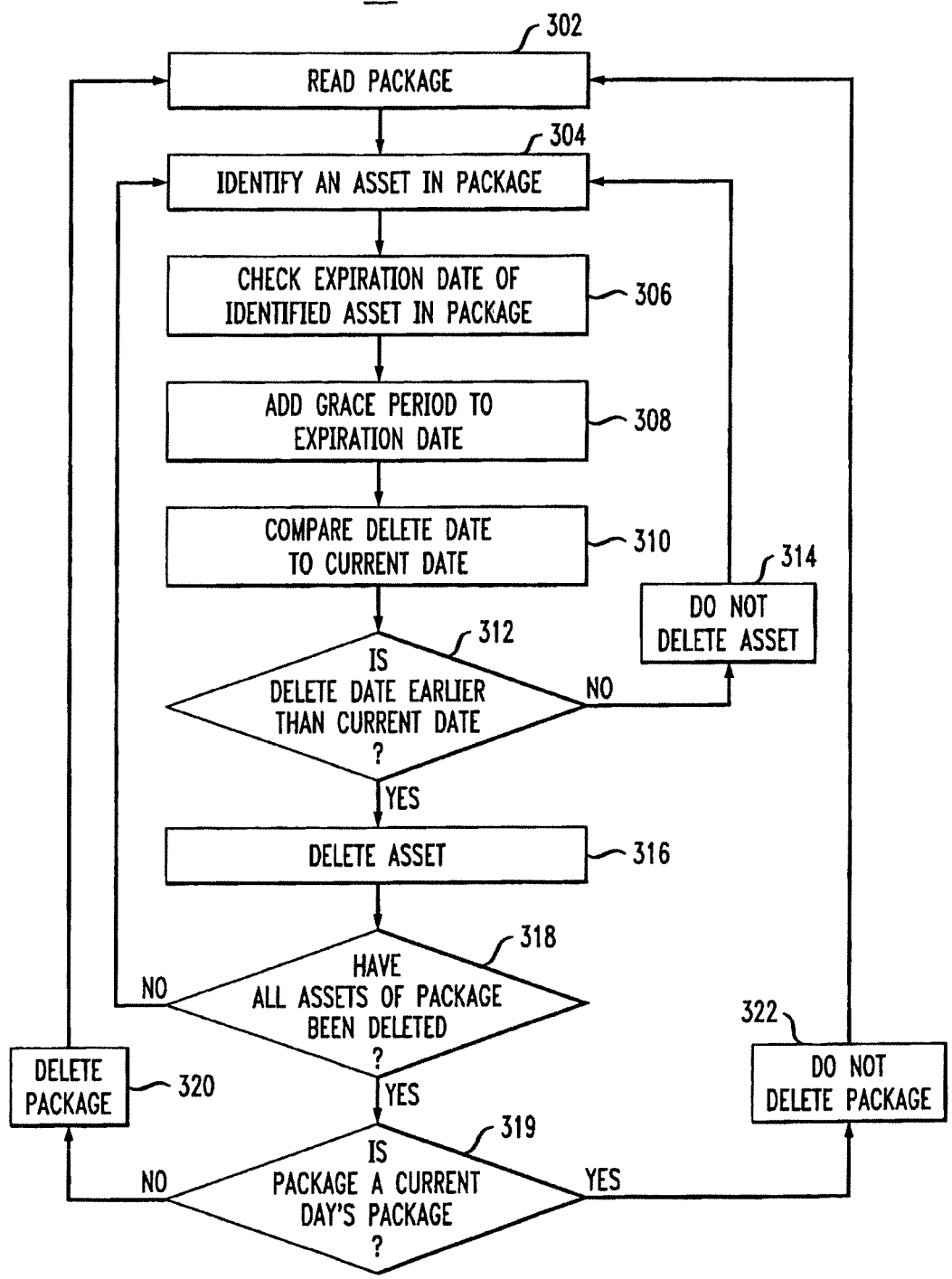

US 9,681,164 B2

SYSTEM AND METHOD FOR MANAGING PROGRAM ASSETS

RELATED APPLICATIONS

The present application is a continuation of U.S. patent application Ser. No. 12/930,023, which was filed on Dec. 23, 2010 and will issue on Oct. 20, 2015 bearing U.S. Pat. No. 9,167,210; which is a continuation of U.S. patent application Ser. No. 10/756,563, which was filed on Jan. 13, 2004 and issued on Dec. 28, 2010 bearing U.S. Pat. No. 7,861,274; all of which are assigned to the assignee of the present application and are incorporated by reference herein.

FIELD OF THE INVENTION

The invention relates to communications systems and methods, and, more particularly, to a system and method for monitoring expiration dates of stored assets and deleting expired assets.

BACKGROUND OF THE INVENTION

Personal video recorders (PVRs), also known as digital video recorders (DVRs), such as TiVO and ReplayTV devices, are popular nowadays for their enhanced capabilities to record television programming. They may offer such functions as "one-touch programming" for automatically recording every episode of a show for an entire season, "commercial advance" for automatically skipping through commercials while watching a recorded broadcast, an "on-screen guide" for looking up recorded programs to view, etc. The PVRs may also suggest programs for recording based on a user's viewing habit. These devices also enable the "pausing", "rewinding" and "fast-forwarding" of a live television ("TV") broadcast while it is being recorded. However, PVRs typically use electronic program guides (EPGs) to facilitate the selection of programming content for recording. In instances where the actual broadcast start or end time of a program is different than the EPG start or end time, programming content is often recorded that the user did not want, or all of the programming content that the user intended to record is not actually recorded. The program guide data stream is typically provided by a third party that aggregates program scheduling information from a plurality of sources of programming.

The actual start and end times for a given broadcast program may be different than the EPG start and end times for various reasons. For example, overtime in a sports event may cause the event to go beyond the scheduled end time. Presidential news conferences, special news bulletins and awards ceremonies often have indeterminate endings, as well. Technical difficulties causing the content provider to broadcast a program at a time other than that which is scheduled may also cause a variance in the start and/or end time of a program. In addition, when the time of one program provided on a specific channel is off schedule, subsequent programs provided by the channel may also be unexpectedly affected, interfering with the ability to record the subsequent program. To avoid offsetting the start and end times of subsequent programs, scheduled programming content may be manipulated (for example, a certain program or commercial segment may be skipped and therefore not broadcast), which may prevent programming of the skipped program. This makes recording programs for later viewing difficult.

Video on demand ("VOD"), movie on demand ("MOD") and network digital video recorder ("DVR") services, which may be subscription services, address at least some of these disadvantages by storing broadcasted video, movies and television programs (referred to collectively as "content") for later retrieval by customers. Content may be acquired and stored in real time, from multiple origination points. Typically, entire transport signal streams for each broadcast channel are stored each day. When a customer requests a particular piece of content that has already been broadcast and stored, the system may fetch the requested content from storage based on the program times in an EPG and transmit the program to the customer. An example of a network DVR system is described in co-pending application Ser. No. 10/263,015, filed on Oct. 2, 2002 (U.S. Patent Publication No. 2003/0208767A1), which is incorporated by reference herein.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions that allow multiple pieces of content, with different video and audio feeds, to be multiplexed in a transport stream traversing a single broadcast channel. A digital TV receiver may be used to decode an MPEG-2 encoded transport stream and extract the desired program therefrom. Audio may also be formatted in Dolby AC-3 format, developed by Dolby Laboratories, San Francisco, Calif., and described in Digital Audio Compression Standard (AC-3), by the United States Advanced Television Systems Committee ("ATSC") (Dec. 20, 1995), for example. Prior art PVRs take advantage of compression of video and audio data to maximize use of their limited storage capacity, minimizing the cost of the PVR.

In accordance with the MPEG-2 standard, for example, video data is compressed based on a sequence of groups of pictures ("GOPs"), in which each GOP typically begins with an intra-coded picture frame (also known as an "I-frame"), which is obtained by spatially compressing a complete picture using discrete cosine transform (DCT). As a result, if an error or a channel switch occurs, it is possible to resume correct decoding at the next I-frame.

The GOP may represent up to 15 additional frames by providing a much smaller block of digital data that indicates how small portions of the I-frame, referred to as macroblocks, move over time. Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by respective continuous elementary streams. The video and audio streams are multiplexed. Each stream is broken into packets, resulting in packetized elementary streams (PESs). These packets are identified by headers that contain time stamps for synchronization, and are used to form MPEG-2 transport streams. For digital broadcasting, multiple pieces of content and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as metadata and MPEG-2 program specific information ("PSI") describing the transport stream. The MPEG-2 PSI includes a program or content associated table ("PAT") that lists every piece of content in the transport stream. Each entry in the PAT points to a program map table (PMT) that lists the elementary streams making up each program. Some programs are open, but some programs may be subject to conditional access (encryption) and this information is also carried in the MPEG-2 PSI.

The aforementioned fixed-size data packets in a transport stream each carry a packet identifier ("PID") code. Packets in the same elementary streams all have the same PID, so that a decoder can select the elementary stream(s) it needs and reject the remainder. Packet-continuity counts are implemented to ensure that every packet that is needed to decode a stream is received.

An individual pieces of content may be referred to as an asset. An asset may include an aggregation of video, audio and metadata describing the content. An asset may be a container or object, or set of objects to implement a service. Assets may contain the content or a reference to the content, which may be stored as another asset.

Sources of content for VOD, MOD and network DVR services grant rights to respective distributors, such as cable systems, to provide the content to a user of the system, typically for a predetermined period of time. These rights may include operational rights and operational time windows. For example, when a cable company contracts with a source of programming, the cable company may only acquire limited rights to the use of a particular program. Certain pieces of content may only be broadcast once while others may be stored and retrieved for additional transmission. The right to store and retrieve may be unlimited or may have an expiration date. The rights related to a particular piece of content or portion of content may dictate how the content is processed by the cable system (such as whether it is stored for later retrieval or not). Other granted rights may relate to advertising deletion or replacement in transmitted content, for example. The source may also grant rights to allow a user to manipulate content during viewing, such as fast forwarding, reversing, pausing, etc., under the control of a user.

Despite compression, stored content requires a large amount of memory. Systems storing large amounts of content for later transmission must therefore provide a large amount of memory space to store the content, increasing the cost of the system.

SUMMARY OF THE INVENTION

In co-pending, commonly assigned application Ser. No. 10/428,719 ("the '719 application"), filed on May 1, 2003 (U.S. Patent Publication No. 2004/001599A1, U.S. Pat. No. 8,312,504 (issuing on Nov. 13, 2012), segmentation messages inserted into a transport signal stream by sources of content are used by a distributor of the content, such as a cable system, to facilitate storage and management of content for later retrieval by customers. Two types of segmentation messages are disclosed: content segmentation messages and rights-related segmentation messages. Content segmentation messages may be used to indicate upcoming events, such as a start and an end of a piece of content or a content portion. Rights related segmentation messages may include information about the scope of the rights related to a particular piece of content, granted by a source of the content to a distributor of the content, such as a cable system. The rights information may be stored in or in association with the stored asset. The rights may also be monitored over time to identify whether granted rights have expired. If rights to transmit an asset have expired, the asset may be deleted from the system. Application Ser. No. 10/428,719 is incorporated by reference herein.

In accordance with embodiments of the present invention, assets are deleted from storage based, at least in part, on expiration dates of a respective asset, beyond which a right to transmit the asset expires, a predetermined period of time added to or subtracted from the expiration date, and/or whether the asset has been selected for later viewing. Whether the predetermined period of time is added to or subtracted from the expiration date may depend on the rights granted by the source of the asset. As used herein, the term "date" may comprise a date and time. The predetermined period of time may provide a grace period during which a user may complete viewing of an asset after viewing is scheduled to end, if viewing of the asset commenced prior to the expiration date. For example, the grace period may be added to the expiration date, if allowed by the source of the asset, to enable a user to complete viewing of an asset after the expiration date, when viewing started before the expiration date. Alternatively, if the source of the asset will not allow viewing after the expiration date, then the grace period may be subtracted from the expiration date. In that case, users may start viewing the asset up until the start of the grace period, and can complete viewing within the grace period. In one example, the user cannot start viewing during the grace period, although that could be an option.

In accordance with an embodiment of the invention, a method of operating a communications system storing assets for later transmission is disclosed. The assets have respective expiration dates beyond which a right to transmit expires. The method comprises checking an expiration date of an asset and deleting the asset from storage based, at least in part, on a deletion date that is a function of the expiration date and a predetermined period of time. The predetermined period of time may be added to the expiration date or subtracted from the expiration date, dependent on the rights granted by the source of the asset. The deletion date may be compared to a current date and the asset may be deleted based, at least in part, on whether the deletion date is earlier than the current date. The predetermined period of time may depend, at least in part, on a length of playtime of the asset.

A first asset containing content may be stored in a first location, a second asset comprising a first pointer to the first asset may be stored in a second location, expiration information associated with the content may be stored in a third location, and the second asset may further comprise a second pointer to the respective expiration information. The method may further comprise identifying the second asset and locating the expiration information based on the second pointer in the second asset. The expiration date corresponding to the content may be determined based, at least in part, on the expiration information. A plurality of second assets corresponding to a respective plurality of pieces of content may be stored as a package and the method may further comprise selecting a package, identifying the second asset in the package and deleting the package based, at least in part, on whether all the second assets in the package have been deleted.

In accordance with a related embodiment of the invention, a communications system for storing assets for later transmission is disclosed, wherein the assets have respective expiration dates beyond which a right to transmit expires.

The system comprises means for checking an expiration date of an asset and means for deleting the asset from storage based, at least in part, on a deletion date. The deletion date is a function of, at least in part, the expiration date and a predetermined period of time.

In accordance with another related embodiment of the invention, a communications system to store assets for later transmission is disclosed, wherein the assets have respective expiration dates beyond which a right to transmit expires. The system comprises memory to store assets and a processor coupled to the memory. The processor is programmed to check an expiration date of an asset and delete the asset from the memory based, at least in part, on a deletion date, which is a function of, at least in part, the expiration date and a predetermined period of time. The processor may be further programmed to perform any of the other steps discussed above, as well as other steps.

In accordance with another embodiment of the invention, a method of operating a communications system storing assets for later transmission is disclosed. The method comprises checking whether the asset has been selected for viewing and deleting the asset based, at least in part, on whether the asset has been selected. The assets may have respective expiration dates beyond which a right to transmit expires and the asset may be deleted based, at least in part, on the expiration date, as well. The assets may also have respective deletion dates, which are a function of the expiration date and a predetermined period of time, and an asset may be deleted based, at least in part, on the respective deletion date.

In a related embodiment, a communications system for storing assets for later transmission is disclosed comprising means for checking whether the asset has been selected for viewing and means for deleting the asset based, at least in part, on whether the asset has been selected.

In another related embodiment, a communications system to store assets for later transmission is disclosed comprising memory to store assets and a processor coupled to the memory. The processor is programmed to check whether the asset has been selected and delete the asset based, at least in part, on whether the asset has been selected. The assets have respective expiration dates beyond which a right to transmit expires and the processor may be further programmed to check an expiration date and delete the asset based, at least in part, on the expiration date. The assets may also have respective deletion dates, which are a function of the expiration date and a predetermined period of time, and the processor may be programmed to delete an asset based, at least in part, on the respective deletion date.

BRIEF DESCRIPTION OF THE DRAWINGS

FIG. 7 is an example of a method that may be implemented by the headend of FIG. 6, in accordance with another embodiment of the invention.

DETAILED DESCRIPTION OF THE PREFERRED EMBODIMENT

In accordance with an embodiment of the invention, expiration dates of stored assets, beyond which rights to transmit the assets expire, are evaluated and assets whose expiration dates have passed are automatically removed from the system. Removing expired assets makes available memory space for storage of new assets. The stored assets may correspond to content stored by a cable system or other such distributor of content to users of the system, for later transmission on demand, for example. The content may be video, movies or television programs, for example. The expiration date typically includes a defined date and time. In one example, a grace period is added to the expiration date, to ensure that an asset is not removed from the system prior to completion of the transmission of the requested content, if transmission has started to a user prior to the expiration date. If a user starts to view selected content prior to the expiration date, the grace period allows the user to complete viewing of the content after expiration. In another example, where the cable system does not have a right to continue to transmit a program after the expiration date, the grace period is subtracted from the expiration date. In that case, a user who starts viewing a selected program prior to the start of the grace period will be able to view the entire program. After the conclusion of the grace period, the stored asset corresponding to the content is removed from the system.

The cable system may allow a user to "look back" in a program guide a predetermined period of time, such as two days, to select a program that has already been broadcast, for viewing at that time or at a later time. The user may also be able to "look forward" in the program guide a predetermined period of time, such as two weeks, to select content for later viewing. The user may view a selected program for a predetermined period of time after the initial broadcast, as defined by the rights granted by the source of the content.

The timing of asset deletion may also depend on whether an asset has been selected for viewing. Assets that have not been selected may be deleted prior to the expiration date and/or without consideration of the grace period.

Figure 1:
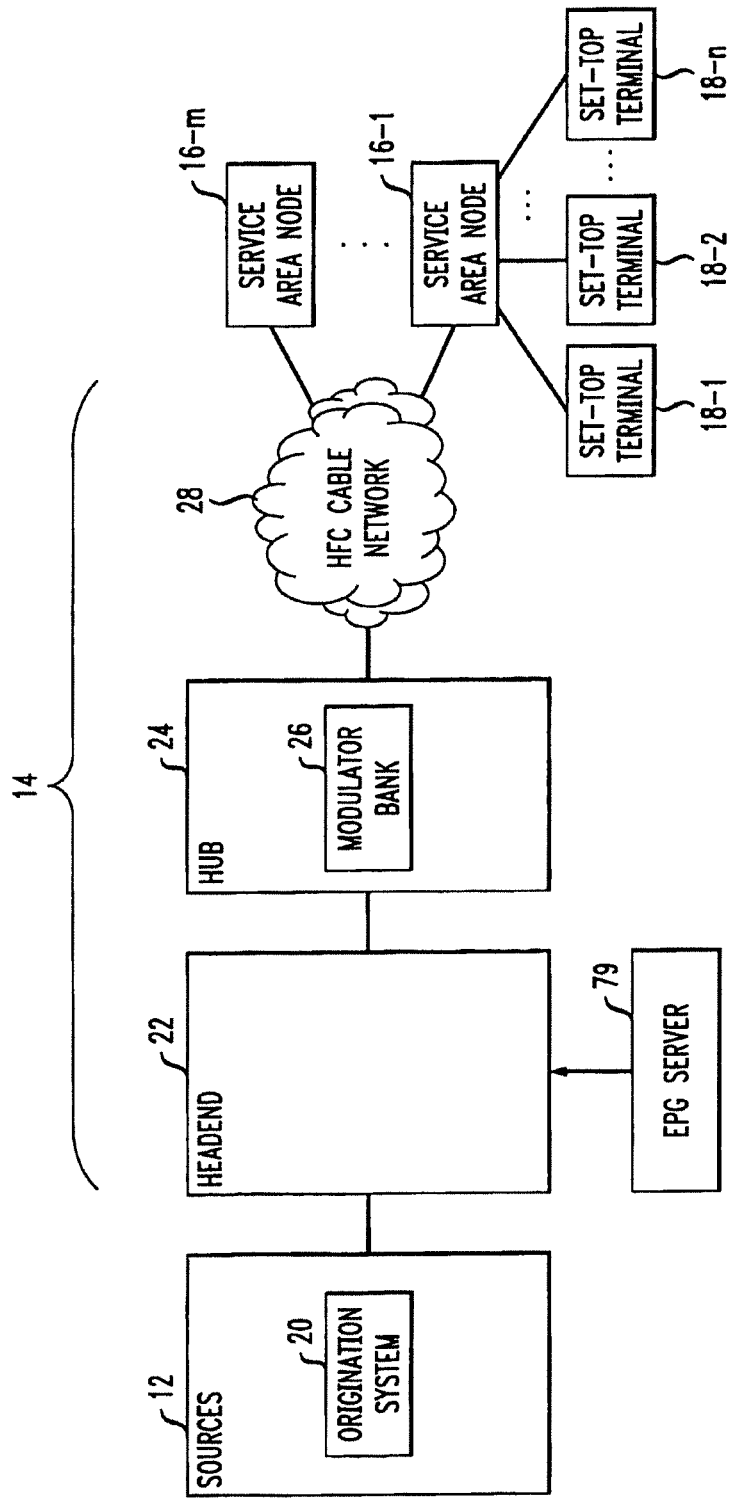
FIG. 1 is a block diagram of certain components of an example of a broadband communications system embodying principles of the invention.

FIG. 1 is a block diagram of certain components of an example of a broadband communications system 10 embodying principles of the invention. The system includes one or more sources 12 of content, cable system 14 and a plurality of service area nodes 16-1 through 16-m in a neighborhood. Service area node 16-1, for example, is coupled to set-top terminals 18-1 through 18-n, at user's televisions ("TV's"). Cable system 14 delivers information and entertainment services to set-top terminals 18-1 through 18-n. Service area nodes 16-1 through 16-n and set-top terminals 18-1 through 18-n may or may not be part of Cable System 14.

Sources 12 create and broadcast content to cable system 14 through origination system 20. An example of an origination system is described in co-pending application Ser. No. 10/263,015 ("the '015 application"), filed on Oct. 1, 2002 and issued on May 15, 2011 bearing U.S. Pat. No. 7,808,626, which is incorporated by reference herein. Sources 12 include analog and digital satellite sources that typically provide the traditional forms of television broadcast programs and information services. Sources 12 also include terrestrial broadcasters, such as broadcast networks (CBS, NBC, ABC, etc., for example), which typically transmit content from one ground antenna to another ground antenna and/or via cable. Sources 12 may also include application servers, which typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services; and media servers, which provide time-critical media assets such as Moving Pictures Experts Group 2 ("MPEG-2") standard encoded video and audio, MPEG-2 encoded still images, bit-mapped graphic images, PCM digital audio, Dolby Digital Audio (AC-3), three dimensional graphic objects, application programs, application data files, etc. Although specific examples of programs and services which may be provided by the aforementioned sources are given herein, other types of content and services may also be provided by these or other sources without departing from the spirit and scope of the invention. For example, one or more sources may be vendors of content, such as video, movie and/or on-demand content, for example.

Cable system 14 includes headend 22, which processes content streams, such as transport streams of television programs, for example, from sources 12 in digital and analog forms. Digital TV streams may be formatted according to Motorola Digicipher System, Scientific Atlanta Powerview Systems, the Digital Satellite System (DSS), Digital Broadcast Services (DBS), or Advanced Television Standards Committee (ATSC) standards, for example. Analog TV program streams may be formatted according to the National Television Standards Committee (NTSC) or Phase Alternating Line (PAL) broadcast standard. Headend 22 extracts content in the analog and digital TV streams and reformats the content to form one or more MPEG-2 encoded transport streams for transmission to users at set-top terminals 18-1 through 18-n. Such reformatting may be applied to received streams that are already in an MPEG-2 format. This stems from the fact that the digital content in the received MPEG-2 streams are typically encoded at a variable bit rate (VBR). To avoid data burstiness, headend 22 may re-encode such digital content at a constant bit rate (CBR) to form transport streams in a conventional manner. Headend 22 is discussed in more detail below, with respect to FIGS. 2 and 3.

The generated transport signal streams are typically transmitted from headend 22 to hub 24 via Internet Protocol ("IP") transport over optical fiber. The transport signal streams may also be transmitted as intermediate frequency signals that have been amplitude modulated ("AM") or as a digital video broadcast (DVB) a synchronous serial interface (ASI) that has also been AM modulated. Hub 24 includes modulator bank 26, among other components. Modulator bank 26 includes multiple modulators, each of which is used to modulate transport streams onto different carriers. Hub 24 is connected to hybrid fiber/coax (HFC) cable network 28, which is connected to service area nodes 16-1 through 16-m. The transport streams may be recorded in headend 22 so that the users at the set-top terminals may manipulate (e.g., pause, fast-forward or rewind) the programming content in the recorded streams in a manner described in the '015 application, which is identified above and is incorporated by reference herein. In addition, in accordance with an embodiment of the invention, the transport signal streams are processed and stored by headend 22 based, at least in part, on the segmentation messages, as described further below.

Figure 2:
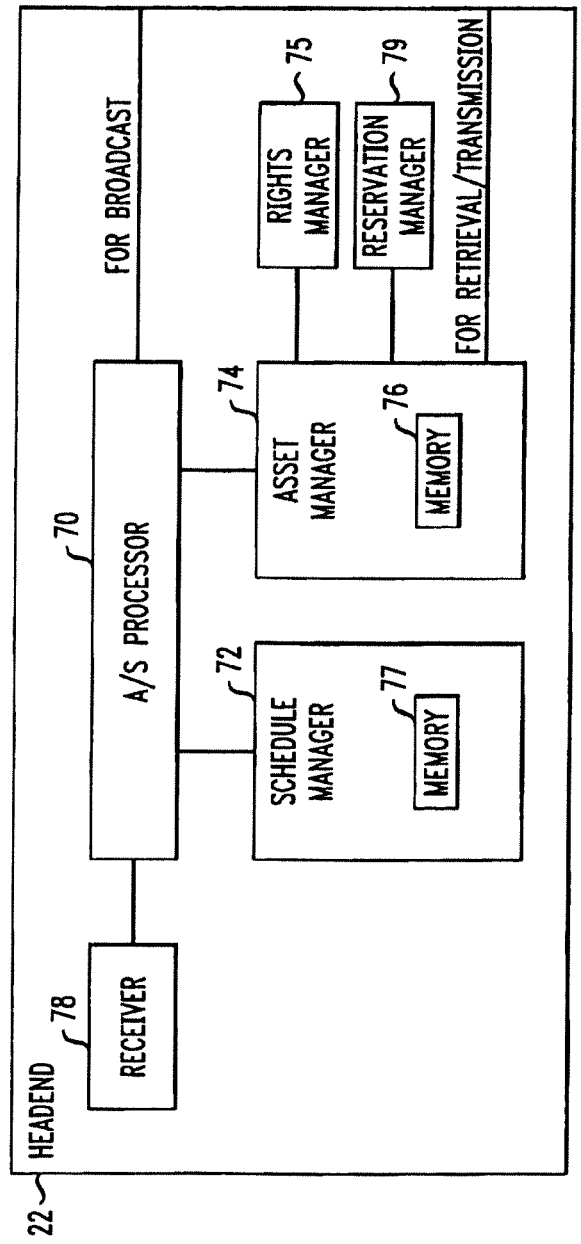
FIG. 2 is a schematic diagram of certain components of an example of a headend of a cable system of FIG. 1.

FIG. 2 is a schematic diagram of certain components of an example of headend 22 of cable system 14. Headend 22 includes an acquisition and staging ("A/S") processor 70, schedule manager 72, asset manager 74, reservation manager 79, receiver 78 and rights manager 75. Asset manager 74 includes memory 76. Schedule manager includes memory 77.

Figure 3:
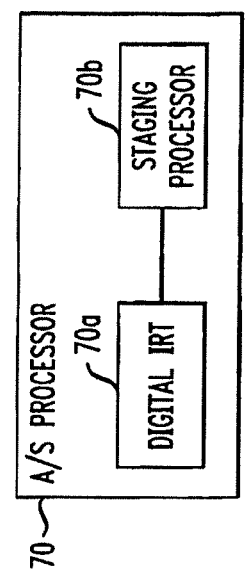
FIG. 3 is a block diagram of certain components of an acquisition and staging processor of the headend of FIG. 2.

Headend 22 receives content from sources 12 via receiver 78, which couples the received transport signal streams to A/S processor 70. Receiver 78 may comprise one or more satellite dishes, for example. A/S processor 70 may comprise an acquisition processor, such as a digital integrated receive transcoder ("IRT") 80 and a staging processor 82, as shown in FIG. 3. A/S processor 70 receives and processes transport streams for broadcast to service area nodes 16-1 through 16-m via hub 24 and HFC cable network 28. IRT 78a receives the digital program stream, decodes the stream and outputs an MPEG-2 signal stream to staging processor 80b. Staging processor 80 may re-encode a VBR program stream to a CBR stream, if necessary, as discussed above. The broadcast of program signal streams and headend 22 are described in more detail in the '015 application, identified above and incorporated by reference herein.

In this example, A/S processor 70 is also a content splicer that processes content into assets stored in memory 76 of asset manager 74. Staging processor 82 may segment transport streams based on segmentation messages in the stream and externally provided schedule information, under the control of schedule manager 72, as described in co-pending application Ser. No. 10/428,719 ("the '719 Application"), filed on May 1, 2003, which is incorporated by reference herein and further identified above. Briefly, such segmentation messages may be inserted into the transport stream by a source 12 of the stream, to identify events in the transport signal stream, such as the boundaries of the content and portions of the content. Content segmentation messages may be placed in the program signal stream prior to an event to indicate a time period until one or more of the following: the start of a piece of content, the end of a piece of content, the start of a chapter of the content, the end of the chapter of the content, the start of network advertising, the end of network advertising, the start of local advertising, the end of local advertising, the start of unscheduled content and the end of unscheduled content, for example. Expanses of the content and content portions may thereby be readily and accurately identified, segmented from the transport signal stream and stored as discrete assets for later retrieval, regardless of delays in broadcasting caused by overruns of earlier pieces of content, for example. Content portions may include chapters, such as a monolog, skit, musical performance, guest appearance, sports highlight, interview, weather report, innings of a baseball game, or other desired subdivisions of the content. A content portion may also comprise national and local advertising. Unscheduled content (such as overtime of a sports event) may also be a defined content portion.

In one example, the segmentation message may indicate the time to the event, which is used by the staging processor 82 to segment the content into assets for storage at the indicated time. Separate assets may be formed of the content as a whole, the content without advertising and/or chapters, the advertising, the chapters and other content portions, for example. The assets may be stored in memory 76. When a user of system 14 requests a particular piece of content, the corresponding stored asset may be retrieved for transmission. If necessary, the content may be assembled from multiple assets prior to transmission. For example, assets comprising the advertising to be provided with the content, which may be a TV program, for example, may be combined with the program asset itself, prior to transmission.

As discussed above, sources of content provide cable system 14 with a right to broadcast the content at a particular time, typically upon receipt. A source may also grant a right to store the content for transmission at a later time upon the request of a user. Such rights typically expire after a predetermined period of time or at a predetermined date and time.

Rights information related to the scope of the rights with respect to particular content, granted by a sources 12 of the content to a distributor of the content, such as cable system 14, may also be provided as one or more segmentation messages associated with the transport stream, as is also described in the '719 application. The rights may include the right to store the content for later transmission, an expiration date for the transmission right or a period of time during which the content may be transmitted, as well as viewer manipulation rights, such as the right to fast forward, reverse or pause the program. The rights information derived from the segmentation messages may be made part of the segmented asset and/or may be stored in another memory location or memory device. If stored in another memory location or memory device, an association may be provided between the asset and the related rights information, as discussed further, below. Rights information may be provided separately from the transport stream, as well.

Asset manager 74, including memory 76, is coupled to A/S processor 70, to receive the expanses of content and content portions segmented by A/S processor 70, format the segmented content and content portions (if necessary) to create respective assets, and store the assets. Asset manager 74 manages the retrieval and transmission of requested stored content, as well. Memory 76 and memory 77 may each be disk caches, for example, having a memory capacity on the order of terabytes. Asset manager 74 formats the expanses into assets by associating a program or content identification code ("PIC") with each expanse, facilitating location and retrieval of the asset from memory 76. The PIC information may be derived from or may actually be the segmentation message in the program stream. Program portion assets, such as chapter and advertising portions, may also be formatted by being associated with the PIC of the content and another code or codes uniquely identifying the portion and the location of the portion in the content. Such codes may be formatted by A/S processor 70, as well.

It is noted that in addition to the raw content, metadata may also be associated with or provided in the asset, to describe characteristics of the asset. For example, metadata may describe attributes that are inherent in the content of the asset, such as the format, duration, size, encoding method and/or Dolby specific and other program specific information ("PSI"). Values for asset metadata and PSI are also determined at the time the asset is created by asset manager 74 or A/S processor 70.

As mentioned above, in accordance with one embodiment of the invention, headend 22 also contains rights manager 75, which is also coupled to asset manager 74. Rights manager 75 monitors and manages the content stored in asset manager 74 (in memory 76). Rights manager 75 may receive and process rights information from sources 12. The rights information may be downloaded from a website of a respective source 12, for example. Rights information may also be derived from segmentation messages, associated with an asset received from a source 12. Reservation manager 79 is also provided, to monitor and manage the selection of content by users for later viewing. The user views such selections through a terminal and a display device, such as set-top terminal 18-1 and a TV in their home, for example. The reservation process is described in more detail in U.S. Pat. No. 7,073,189, which is incorporated by reference herein.

As mentioned above, cable system 14 may enable a viewer to "look back" in an EPG a predetermined period of time prior to an "air date" of a piece of content that has already been broadcast, to select the content for later viewing. An "air date" is a date (and time) of a live broadcast of a television program, video, movie, or other such content. The look back period is preferably at least 12 hours. It may be 48 hours, for example. A user may watch a program selected during the look back period immediately, or may have cable system 14 store the program for the user, for later viewing. The system 14 may also enable a viewer to "look forward" a predetermined period of time from the air date in the EPG, (such as two weeks) to reserve a program that has not yet been broadcast for viewing sometime after broadcast. The look back and look forward time periods may have different lengths. Selection of a program in the look back period or the look forward period may place the selected program into a user "show list," for example. The period of time that a selected piece of content on the user's show list is available to be viewed (the "availability period") may be a predetermined period of time after the air date set by source 12 of the content or a period of time up to a specific date (and time) set by the source, for example. Cable system 14 may also set the availability period. The availability period may range from 0 seconds (no right to transmit after broadcast), to several hours or days, to several weeks or more. The end of the availability period is referred to as an availability date. The availability date may or may not coincide with the expiration date, as discussed further below.

When the availability period is within a predetermined period of time of ending for a particular piece of content, cable system 14 may warn users who have selected the content for their show list but have not yet viewed it, that the content will be unavailable after a particular date and time. The program may be selected from the show list by the user during the availability time period for transmission by the cable system for viewing.

In one implementation, cable system 14 may delete a stored asset corresponding to a piece of content from the system after the expiration date of the content. Deletion of expired assets makes memory available for new assets. A user will not, however, be able to view a selected program that has been deleted. To ensure that users have an opportunity to complete viewing selected content that they started to view just prior to the expiration date, in accordance with an embodiment of the invention, a "grace period" after the expiration date or end of the availability period (if it is different from the expiration date) is preferably provided for a user to finish watching a selected piece of content on their user list, if the user has started viewing the content prior to the expiration date (or availability period). For example, if a user reserves a two hour TV program on the second day of a two week availability period and starts watching the program one hour prior to the expiration date, the user will be able to finish viewing the program after the expiration date. Preferably, a viewer cannot start viewing a reserved program after the expiration date.

In another implementation, the grace period is subtracted from the expiration date. This might be necessary where source 12 will not allow transmission after the expiration date, even if transmission started prior to the expiration date. Cable system 14 may then establish an availability period with an availability date prior to the expiration date. An asset is not available for selection or for the start of viewing after the availability date. The time between the availability date and the expiration date may be a grace period. The availability date may be determined by subtracting the grace period from the expiration date. The availability period may extend up to the availability date.

The grace period is preferably at least as long as the program. Preferably, the user may rewind, pause or fast forward the program during the grace period, as well. To accommodate user manipulation of the program (particularly rewind and pause), the grace period is preferably longer than the program. The grace period may be the same for all assets. 4-8 hours, for example, would be sufficient to allow a user to complete viewing of most, if not all, pieces of content, including viewer manipulation of the content while viewing. The grace period may also depend on the length of the selected content. For example, a one hour grace period may be provided for a half hour program, a two hour grace period may be provided for a one hour program and a four to six hour grace period may be provided for a two hour program, for example, to safely accommodate a typical amount of pausing and rewinding.

In accordance with an embodiment of the invention, assets are automatically removed from the system 14 after the end of the grace period by software. In accordance with another embodiment, to free up storage space for new assets more quickly, if a stored asset is not selected before a predetermined period of time or a date, such as at the end of the lookback period, or sometime prior to the expiration date or availability date, then that asset may be removed without taking into consideration all or part of the grace period.

Figure 4:
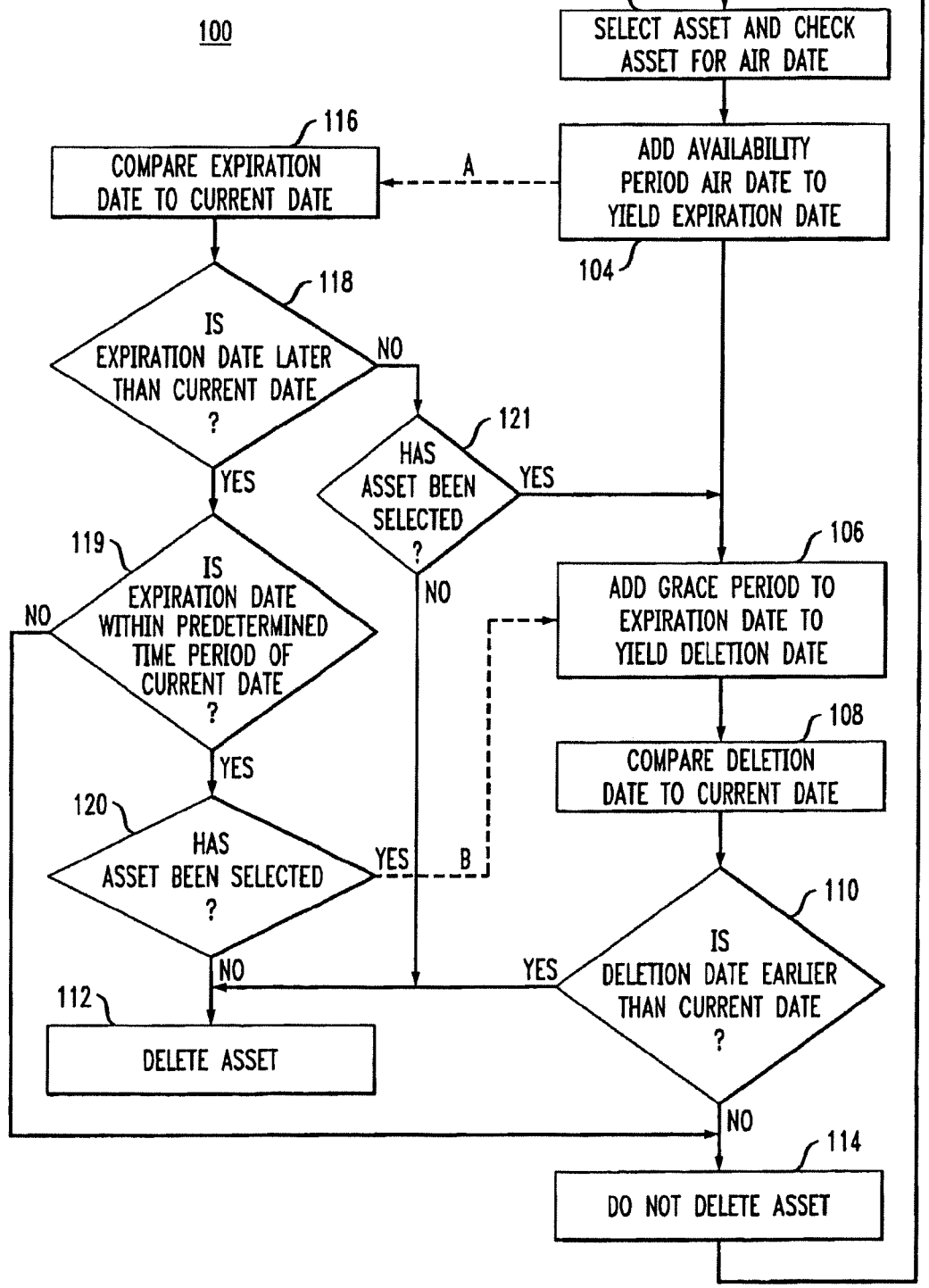
FIG. 4 is an example of a method in accordance with one embodiment of the invention.

FIG. 4 is an example of a method 100 in accordance with one embodiment of the invention. In this example, the source 12 allows the continued transmission of an asset after the expiration date, if transmission has started prior to the expiration date. In addition, all stored assets have the same look back period and the same look forward period. For example, the look back period is two days and the look forward period and availability periods are both two weeks for all assets. Rights expire for all content two weeks from their air date. An 8 hour grace period is provided after expiration for a user who reserved and started viewing a piece of content, but has not completed viewing prior to the expiration date. In addition, rights information, such as the asset's air date, is stored in metadata of the asset. The asset stored in the memory 76 of the asset manager 74 is the content (MPEG file, for example) of the asset. The method may be implemented by rights manager 79, which may be a processor controlled by suitable software, for example.

The software program implementing method 100 is initiated in Step 102, where an asset is selected and an air date of the asset is checked. The software may be initiated periodically, such as daily or hourly, for example, or may run continuously. The air date may be provided in the metadata associated with the asset in the memory 76, for example. The availability period is added to the air date to yield a first, expiration date, in Step 104. The expiration date comprises a date and time, as does the air date. A grace period is added to the first date to yield a second, deletion date, in Step 108. The second date also defines a date and time.

The deletion date is compared to the current date in Step 110. The current date comprises a date and time. If the deletion date is earlier in time than the current date, the asset has expired and may be deleted, in Step 112. If the deletion date is later in time than the current date, the asset is not deleted, as indicated in Step 114. Step 110 may also check whether the deletion date is earlier than or the same as the current date and proceed to Steps 112 or 114, accordingly. The method 100 may continue by returning to Step 104 to select and check another asset.

Since a grace period is not needed if an asset has not been selected for later viewing, the software program may optionally check whether the asset has in fact been selected. For example, after Step 104, the software may compare the first date to the current date, in Step 116, (as indicated by arrow A, in phantom). If the expiration date is not later than the current date, in Step 118, and the asset has not been selected in Step 121, the asset may be deleted, without consideration of the grace period. For example, assets that have not been selected by the end of the lookback period can no longer be selected and may be deleted prior to the expiration date and without consideration of the grace period. If the asset has been selected in Step 121, then the program proceeds to Step 106. Asset selection may be monitored by the reservation manager 79, as discussed above.

If the expiration date is later than the current date in Step 118, and within a predetermined time period of the expiration date, such as one day, in Step 119, then the software may determine whether the asset has been selected for viewing, in Step 120. If the asset has been determined to have been selected for later viewing in Step 120, the method may proceed to Step 106 (as indicated by arrow B in phantom). If the asset has not yet been selected, there may be little or no need for a grace period and the asset may be deleted, in Step 112. The predetermined period of time may be selected so that the risk that a user will select the asset is acceptably low. The predetermined period of time may coincide with the lookback period, for example, after which time the asset can no longer be selected. If the asset has been selected, then the asset is not deleted, in Step 114, and the software proceeds to select and check the date of another asset.

If the expiration date is not within the predetermined time period of the current date, the method proceeds to Step 114 and the asset is not deleted.

In the example, above, the metadata defining the air date of the content and the availability period, at the end of which rights expire, is two weeks and is calculated in Step 104.

Figure 5:
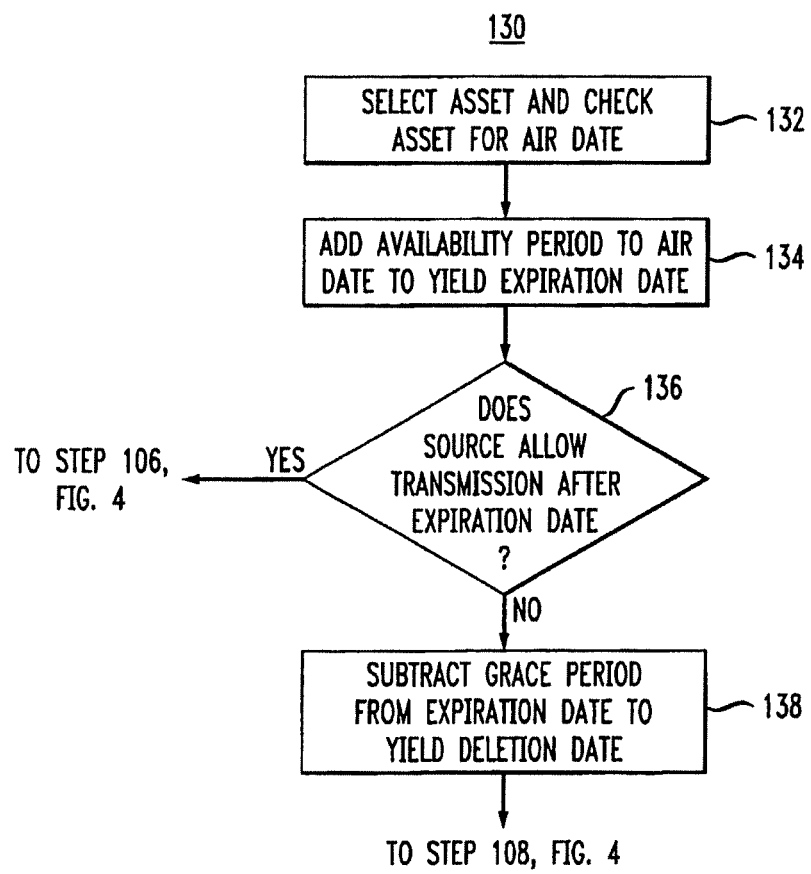
FIG. 5 is an example of a method in accordance with another embodiment of the invention.

FIG. 5 is an example of a method 130 that may be implemented when source 12 may not authorize transmission after the expiration date. An asset is selected and the air date is checked, in Step 132, as described above with respect to Step 102 of FIG. 4. An availability period is added to the air date to yield an expiration date, in Step 134, as is also described above with respect to Step 104 in FIG. 4.

It is determined whether the source allows transmission after the expiration date, and hence use of a grace period after the expiration date, in Step 136. This may be done in a number of ways. For example, whether source 12 will allow transmission of an asset during a grace period after the expiration date or not, may be provided in the asset metadata by source 12 or cable system 14. Such information may also be stored in a table in association with an identification of an asset, for example. For example, rights manager 75 may store such information in memory, such as in a database (not shown).

If it is determined that the source 12 allows use of a grace period after the expiration date, in Step 136, then the method 130 continues to Step 106 in FIG. 4. If it is determined that the source has not authorized a grace period after the expiration date, then a grace period is subtracted from the expiration date to yield a deletion date, in Step 138, and the method 130 continues to Step 108 of FIG. 4. The other options of the method 100 of FIG. 4 may be provided in conjunction with method 130, as well. As above, the metadata for some or all assets may also contain the expiration date. In that case, it may not be necessary to compute the expiration date in Step 104. The method 100 can then start at Step 106.

Figure 6:
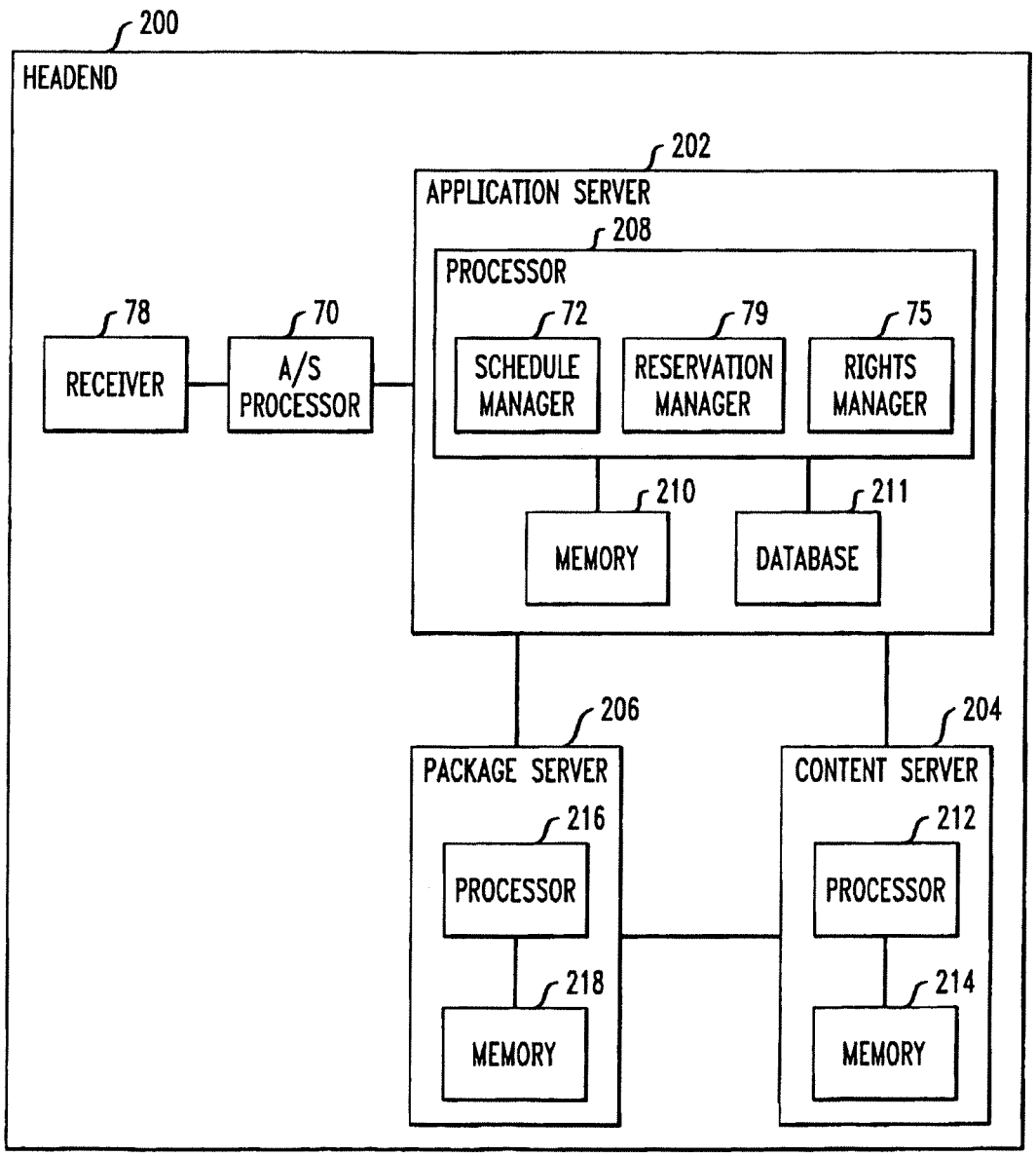
FIG. 6 is a block diagram of certain components of another example of a headend of the cable system of FIG. 1 that may implement embodiments of the present invention.

FIG. 6 is a block diagram of certain components of another example of a headend 200 that may implement embodiments of the present invention. Here, the organization and management of assets are facilitated by separately storing assets containing program content and assets containing pointers to the content assets. Assets are separately stored in packages as well. Headend 200 comprises A/S processor 70 and receiver 78, shown in FIG. 2, application server 202, content server 204 and package server 206. Application server 202 comprises processor 208 comprising schedule manager 72, reservation manager 79 and rights manager 75 of FIG. 2. In addition, application server 208 comprises memory 210 and database 211. Rights manager 75 provides rights information associated with each asset, to database 211. The rights information may be received from the respective sources 12 prior to receipt of the corresponding asset. The rights information may be downloaded from a website of a respective source 12, for example. The rights information may also be derived from segmentation messages associated with the asset received from a source 12. Application server 202 also contains identifications of the sources 12 providing respective content.

Content server 204 and package server 206 each comprise a processor 212, 216 and memory 214, 218, respectively. Memories 210, 214, 218 may be one or more disk caches, for example. Application server 202 may be an Oracle database server, such as Oracle Database Server 8.1.7 with a Solaris Operating System from Oracle Corporation, Redwood Shores, Calif., for example.

Content server 204 stores content assets, typically in MPEG format. Processor 212 of content server 204 manages the storage of content assets and transmission of requested content. Content server 204 should be able to ingest video content at high speed, such as at about 3.75 megabits per second per channel, for example. Content server 204 may have 30 channels to ingest video content, for example. Appropriate servers are available from Midstream Technologies, Inc., Bellevue, Wash., Concurrent Computer Corporation, Duluth, Ga., or nCube America, Beaverton, Oreg., for example.

Package server 206 stores packages of related assets in memory 218. The relation between the assets may be that each asset in a package is from the same source 14 and is provided on the same day, for example. Other relations may be used to define packages, as well. The day may be a Universal Time Coordinate ("UTC") day. Each package has a package date which is the UTC date for all the shows from that Source 14. The assets in a package comprise a pointer to a corresponding content asset in content server 204 and a pointer to the corresponding rights information in database 211. Alternatively, package server 206 may also store rights information related to stored assets and other program information in memory 218, and the second pointer may be to the storage location in memory 218. Package server 206 may be a Business Management Server ("BMS"), for example, implementing the well known Interactive Services Architecture ("ISA") protocol. Application server 202, content server 204 and package server 206 can communicate with each other through the well known Common Object Request Broker Architecture (CORBA) Standard from the Object Management Group, Needham, Mass.

To populate application server 202, content server 204 and package server 206 in one example, schedule manager 72 checks EPG data to identify expected time slots of received content. Schedule manager 72 determines whether cable system 14 has a right to store each particular piece of content, by requesting the rights information for each piece of content from database 211, for example. Schedule manager 72 then creates containers for each piece of content that cable system 14 has a right to store for later transmission. Schedule manager 72 creates an empty MPEG asset file for storage in content server 204 and an asset with a pointer to the MPEG file, for storage in package server 206. A/S processor 70 streams the content corresponding to each asset into the empty MPEG file, as the content is received. Package server 206 may create packages under the control of the schedule manager 72, for example. Alternatively, A/S processor 70 may identify expanses of content and/or rights information from segmentation messages in the transport stream, as discussed above.

FIG. 7 is an example of a method 300 that may be implemented by rights manager 79 in headend 200 under the control of suitable software, in accordance with this embodiment of the invention. As in method 100 of FIG. 4, it is assumed that source 12 allows use of a grace period after the expiration date. If that is not the case, method 300 may be readily adapted to implement method 130 of FIG. 5. Each package in package server 206 is read in Step 302. As discussed above, in this example, packages are collections of assets provided by a particular source on a particular day. The respective sources 12 may be identified from database 211. Packages corresponding to the identified sources are located and then read in package server 206.

Each asset in each package is identified, in Step 304. The expiration date of each identified asset is checked, in Step 306. The expiration dates may be obtained from database 211 of application server 202, in this example.

A grace period is added to the expiration date, in Step 308, to yield a deletion date, after which time an asset may be deleted, in Step 310.

The deletion date is compared to the current date, in Step 312.

If the deletion date is later than the current date, the asset is not deleted, in Step 314, and another asset is evaluated, in Step 304.

If the deletion date is earlier than the current date, the asset is deleted, in Step 316. An asset may be deleted by generating a delete asset message to content server 204 and package server 206, to delete the corresponding asset.

If all assets in a package have been deleted, as determined in Step 318, it is preferably determined whether the package is a current day's package, in Step 319. It is preferred not to delete a current day's package, so that other assets received that day from the same source 12 may be placed in that package. It is noted that assets with short availability periods may be deleted the same day they are received. If the package is not a current day's package, the package may be deleted, in Step 320. A package delete message may be generated to package server 206 to delete the package, for example. Package server 206 could determine this, as well. After deletion of the package, Step 302 may be returned to, to read a new package.

If it is determined that the package is a current day's package, the package is not deleted, in Step 322, and the process returns to Step 302, to read a new package. If it is determined that all assets of the package have not been deleted, in Step 318, the method may return to Step 304 to identify another asset.

The optional routines of method 100 may also be implemented in conjunction with method 300, as well. Method 130 of FIG. 5 may also be implemented, if certain sources 12 may not authorize addition of the grace period to the expiration date.

Rights manager 75 may also implement method 100 of FIG. 4 in headend 200 of FIG. 2, under the control of suitable software. For example, instead of storing an expiration date, an availability period may be stored in database 211 of application server 202. Rights manager 75 may then calculate a first and second date, as in steps 104 and 106 of method 100.

The systems disclosed herein are in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The foregoing merely illustrates the principles of the invention. It will thus be appreciated that those skilled in the art will be able to devise numerous other arrangements which embody the principles of the invention and thus within the spirit and scope of the invention, which is defined in the claims, below.

What is claimed is:

1. A method of operating a distributor of program content storing program content for later transmission to terminals at user locations, wherein respective program content has respective expiration dates beyond which a right granted by a source of the respective program content to transmit the respective program content by the distributor expires, the method comprising:
receiving selections from terminals for respective stored program content for later viewing;
checking by the distributor an expiration date of respective stored program content, the expiration date being provided by the source of the respective program content;
checking by the distributor whether the respective program content has a pending selection for later viewing; and
deleting the respective program content, by the distributor, based, at least in part, on the expiration date and whether there is the pending selection for the respective program content for later viewing.

2. The method of claim 1, comprising deleting the respective program content if: the expiration date is later than or equal to the current date; and the respective program content does not have a pending selection.

3. The method of claim 1, comprising deleting the respective program content if: the respective program content has not been selected for later viewing by a predetermined date.

4. The method of claim 1, further comprising: determining whether the source has authorized transmission of the respective program content after the expiration date, if transmission starts prior to the expiration date; and if the source has authorized said transmission adding a predetermined period of time to the expiration date to determine the deletion date.

5. The method of claim 4, further comprising, if the source has not authorized said transmission, subtracting a second predetermined period of time from the expiration date to determine the deletion date.

6. The method of claim 5, wherein the first predetermined period of time and the second predetermined period of time are the same.

7. The method of claim 6, wherein the first and second predetermined periods of time are based, at least in part, on a length of the respective program content.

8. The method of claim 1, further comprising: determining whether the source has authorized transmission of the respective program content after the expiration date, if transmission starts prior to the expiration date; and if not, subtracting a predetermined period of time from the expiration date to determine the deletion date.

9. The method of claim 1, further comprising: receiving the expiration date for respective program content from a source of the respective program content.

10. The method claim 1, wherein the distributor is a headend of a cable television network, the source of the respective program content is a broadcast source, and the respective program content comprises broadcast content, the method further comprising: receiving broadcast content from the broadcast source by the headend; and delivering the broadcast content to terminals at user locations, through the cable television network, at respective air dates in accordance with a broadcast schedule, by the headend.

11. The method of claim 1, wherein the distributor comprises a processor, the method comprising: checking the expiration date, checking whether the respective program has a pending selection, and deleting, by the processing device.

12. A system to distribute program content for later transmission to terminals at user locations, wherein respective program content has respective expiration dates beyond which a right granted by a source of the respective program content to transmit the respective program content expires, the system comprising: memory to store assets; and a processor coupled to the memory, the processor being programmed to: receive selections from terminals for respective stored assets for later viewing; check an expiration date of an asset, the expiration date being provided by the source of the respective program content; check whether the asset has a pending selection for later viewing; and delete the asset, including the program content, based, at least in part, on the expiration date and whether the asset has a pending selection.

13. The system of claim 12, wherein the processor is programmed to delay deletion of respective program content with a pending selection.

14. The system of claim 12, wherein the processor is programmed to delete the respective program content if: the respective program content has not been selected by a predetermined date.

15. The system of claim 12, wherein the processor is further programmed to: delete the respective program content based, at least in part, on a deletion date, the deletion date being a function of the expiration date and a predetermined period of time.

16. The system of claim 12, wherein the program content is provided to the system by a source of program content separate from the system, the processor being further programmed to: determine whether the source has authorized transmission of the respective program content after the expiration date, if transmission starts prior to the expiration date; and if the source has authorized said transmission add a predetermined period of time to the expiration date to determine the deletion date.

17. The system of claim 16, wherein the processor is further programed to: subtract a second predetermined period of time from the expiration date to determine the deletion date if the source has not authorized said transmission.

18. The system of claim 17, wherein the first and second predetermined periods of time are the same.

19. The system of claim 18, wherein the first and second predetermined periods of time are based, at least in part, on a length of the respective program content.

20. The system of claim 12, wherein the program content is provided to the system by a source of program content separate from the system, the processor being further programmed to: subtract a predetermined period of time from the expiration date to determine the deletion date if the source has not authorized said transmission.

21. The system of claim 16, wherein the distributor is a headend of a cable television network, the source of the respective program content is a broadcast source, and respective program content comprises broadcast content, the distributor further comprising: an interface to receive broadcast content from the broadcast source; and a mechanism to deliver the broadcast content to terminals at user locations, through the cable television network, at respective air dates in accordance with a broadcast schedule; wherein the processor is further programmed to: record the broadcast content and store portions of the recorded broadcast content for delivery to respective users on demand.

22. The system of claim 12, wherein the processor is configured to receive the expiration date for a respective program content from a source of respective program content.

23. The system of claim 12, wherein the processor is configured to transmit a respective stored asset to a user location in response to a selection, if the respective asset has not been deleted.

24. The method of claim 1, further comprising: transmitting respective program content to a user location in response to a respective selection, if the respective program content has not been deleted.

* * * * *